United States Patent
Fink

(10) Patent No.: US 9,342,979 B2
(45) Date of Patent: May 17, 2016

(54) RADIO UNIT FOR FIELD DEVICES USED IN AUTOMATION TECHNOLOGY

(75) Inventor: Nikolai Fink, Aesch (CH)

(73) Assignee: ENDRESS + HAUSER FLOWTEC AG, Reinach (CH)

(*) Notice: Subject to any disclaimer, the term of this patent is extended or adjusted under 35 U.S.C. 154(b) by 997 days.

(21) Appl. No.: 11/667,542

(22) PCT Filed: Nov. 2, 2005

(86) PCT No.: PCT/EP2005/055697
§ 371 (c)(1),
(2), (4) Date: Mar. 27, 2008

(87) PCT Pub. No.: WO2006/053828
PCT Pub. Date: May 26, 2006

(65) Prior Publication Data
US 2008/0299915 A1    Dec. 4, 2008

(30) Foreign Application Priority Data
Nov. 16, 2004   (DE) .................... 10 2004 055 308

(51) Int. Cl.
*H04B 7/00*   (2006.01)
*G08C 17/02*   (2006.01)

(52) U.S. Cl.
CPC ...... *G08C 17/02* (2013.01); *G05B 2219/31251* (2013.01)

(58) Field of Classification Search
CPC .............. G06K 7/10237; G08G 1/096741; G08G 1/096775; H04B 5/02; H04B 7/00; H04B 10/00; H04B 15/00; H04W 84/18; H04W 84/20; H04W 84/22; H04M 1/7253

USPC .............. 455/90.1, 41.1–41.2, 41.3; 340/508, 340/539.1, 693.1, 539.3, 635, 636.2, 870.02
See application file for complete search history.

(56) References Cited

U.S. PATENT DOCUMENTS

| | | | |
|---|---|---|---|
| 7,058,542 B2* | 6/2006 | Hauhia et al. | 702/183 |
| 7,120,391 B2* | 10/2006 | Stengele et al. | 455/41.3 |
| 7,262,693 B2* | 8/2007 | Karschnia et al. | 340/508 |
| 8,538,560 B2* | 9/2013 | Brown et al. | 700/22 |
| 2001/0016891 A1* | 8/2001 | Hagino | 710/129 |
| 2006/0142875 A1* | 6/2006 | Keyes et al. | 700/1 |

FOREIGN PATENT DOCUMENTS

| | | |
|---|---|---|
| DE | 101 09 810 A1 | 9/2002 |
| DE | 102 05 253 A1 | 8/2003 |
| DE | 102 43 619 A1 | 1/2004 |
| DE | 102 55 517 A1 | 6/2004 |

(Continued)

OTHER PUBLICATIONS

Bonadio, et al., "For Remote Stations Fieldbus + PLC + Radio = Economical Network", HighBeam research, http://www.highbeam.com, Feb. 1, 1999, pp. 1-7.*

*Primary Examiner* — Nay A Maung
*Assistant Examiner* — Angelica M Perez
(74) *Attorney, Agent, or Firm* — Bacon & Thomas, PLLC

(57) ABSTRACT

A radio unit RU for field devices used in automation technology can be detachably connected to a field device. Via the radio unit RU, a radio connection to a service unit SU is possible over a radio network. The radio unit RU reads an identifier of the field device F1 from a memory in the field device and uses this identifier to report in the radio network.

17 Claims, 3 Drawing Sheets

(56) References Cited

FOREIGN PATENT DOCUMENTS

| EP | 1 293 853 | A1 | 3/2003 |
| WO | WO 03/023536 | A1 * | 3/2003 |
| WO | WO 2004/047043 | A2 | 6/2004 |

* cited by examiner

RADIO UNIT FOR FIELD DEVICES USED IN AUTOMATION TECHNOLOGY

TECHNICAL FIELD

The invention concerns a radio unit for a field device of automation technology.

BACKGROUND DISCUSSION

In automation technology, field devices are often used, to serve for measuring and/or influencing process variables. Examples of such field devices are fill-level measuring devices, mass-flow measuring devices, pressure and temperature measuring devices, etc., which, as sensors, register the corresponding process variables, fill-level, flow (e.g. flow rate), pressure and temperature.

Field devices serving, as actuators, to influence process variables include, e.g., valves for controlling flow of a liquid in a section of pipeline or pumps for controlling fill level in a container.

A large number of such field devices are manufactured and sold by the firm, Endress+Hauser.

As a rule, field devices in modern manufacturing plants are connected via fieldbus systms (HART, Profibus, Foundation Fieldbus, etc.) to superordinated units (e.g. control systems or control units). These superordinated units serve, among other things, for process control, process visualization, process monitoring, as well as for tasks such as commissioning field devices. Also falling under the heading "field devices" are, in general, such units (e.g. remote I/Os, gateways, linking devices) as are directly connected to a fieldbus and serve for communication with the superordinated units.

Usually, fieldbus systems are integrated into company networks. In this way, process and field device data can be accessed from different areas of an enterprise.

For worldwide communication, company networks can be connected also with public networks, e.g. the Internet.

Modern field devices often exhibit a standardized fieldbus interface for communication with an open fieldbus system and/or a proprietary interface for manufacturer-specific communication with a service unit. Frequently, the service units are portable small-computers (laptops, Palms, etc.), such as are generally known from the field of consumer electronics (office and home computers).

Increasingly users also desire radio servicing of field devices. This applies particularly to field devices arranged in relatively inaccessible locations in an automated facility. Over a radio connection, the user can service these field devices easily and comfortably.

For this reason, it is conceivable that field devices be equipped with a radio interface, which can communicate wirelessly with an appropriate service unit (e.g. laptop, Palm, etc.).

A known standard in the field of wireless communication is the Bluetooth standard, which is often used in consumer applications.

Bluetooth modules available to this point in time report in a radio network using a predetermined, fixed identifier.

It would be conceivable to equip field devices with a Bluetooth module.

A service unit would automatically recognize the Bluetooth module and show the identifier of the Bluetooth module on the screen of the service unit. Via this identifier, the user could select the pertinent field device. For the user, however, it would be extremely disturbing to have to associate the identifier of the radio module with a particular field device, in order to be able to service the pertinent field device. This associating can lead to mixups and thus cause service errors.

Radio modules permanently connected with the field device make the device expensive. The retrofitting of existing field devices would likewise be very complex and expensive.

SUMMARY OF THE INVENTION

An object of the invention is, therefore, to provide a radio module for field devices of automation technology not exhibiting the disadvantages specified above, and which especially makes possible a user-friendly servicing of a field device, while being simple and economical.

An essential idea of the invention resides in the features that the radio unit of the field device is constructed detatchably, reads an identifier of the field device from a memory of the field device, and uses this identifier as its identifier to report in the radio network. The user consequently sees directly on its service device, that it is possible to establish a radio connection with that field device. The identifier can be a device name and a TAG-number or a serial number (e.g. "Promass 83; SN: DEMO9910027"). Via the device name "Promass 83", the user can easily identify the pertinent field device, since the user can associate this product designation with a field device type. Helpfully, the serial number is also given to assist in the case where two field devices of one type are present.

In an advantageous further development of the invention, the radio network is embodied on the basis of the Bluetooth-standard. Many known consumer devices (radio telephones, laptops, Palms) already possess such an interface. Thus, such laptops or Palms can easily be used to service field devices equipped in this way.

Frequently, for servicing the field device via a display on a field device, input of a security code is necessary. This security code is intended to prevent unauthorized persons from changing field-device settings.

In order to prevent an evasion of this safety precaution through the servicing via radio, in a further development of the invention, access to the field device via the radio module is made secure with the same security code. For this, the radio unit reads the appropriate security code from a memory in the field device and blocks each attempt at access to the field device without the appropriate authorization.

The radio unit is equipped in suitable manner with an appropriate service plug connector for an already present, service interface in the field device. This service interface is provided in the case of many conventional field devices for wire-connected communication with a service unit. Any functions of a field device can be accessed via the service interface.

BRIEF DESCRIPTION OF THE DRAWINGS

The invention will now be described in greater detail on the basis of an example of an embodiment shown in the drawing, the figures of which show as follows.

DETAILED DESCRIPTION

Figure 1:
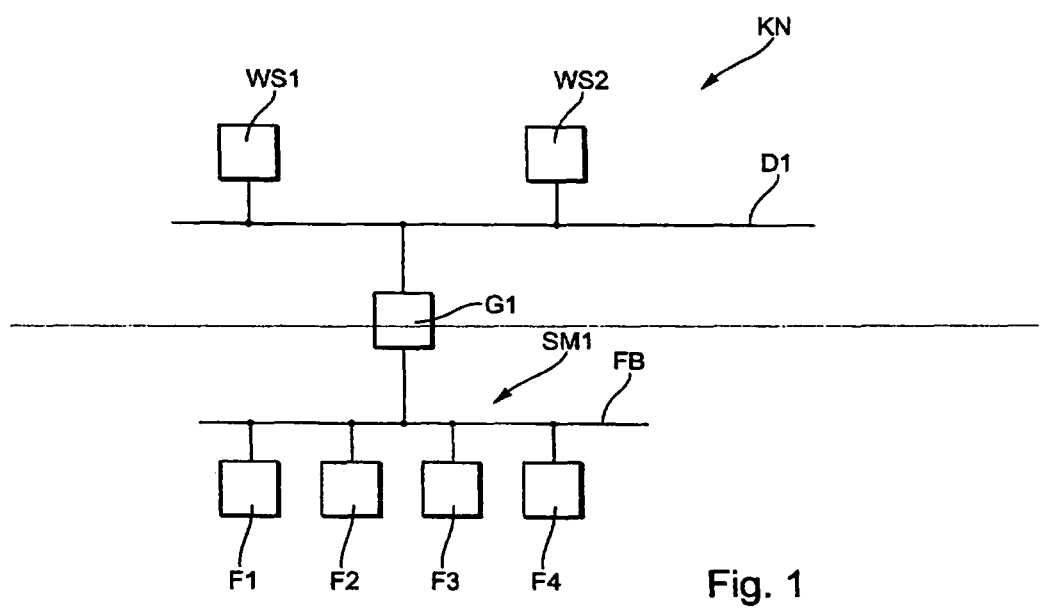
FIG. 1 a schematic illustration of a network of process automation technology network, including a plurality of field devices.

FIG. 1 shows details of a network KN of automation technology. A plurality of computer units in the form of smaller workstations WS1, WS2 is connected to a data bus D1. These computer units serve as superordinated units (control system and/or control unit), among other things, for process visualization, process monitoring and for engineering, as well as for servicing and monitoring of field devices. Data bus D1 works e.g. according to the Profibus DP-standard or the HSE (High Speed Ethernet)-standard of Foundation Fieldbus. Data bus D1 is connected with a fieldbus segment SM1 via a gateway G1, also called a linking device or segment coupler. Fieldbus segment SM1 includes a plurality of field devices F1, F2, F3, F4 connected together by a fieldbus FB. The field devices F1, F2, F3, F4 can be both sensors or actuators. Fieldbus FB works correspondingly according to one of the known fieldbus standards, e.g. Profibus, Foundation Fieldbus or HART.

Figure 2:
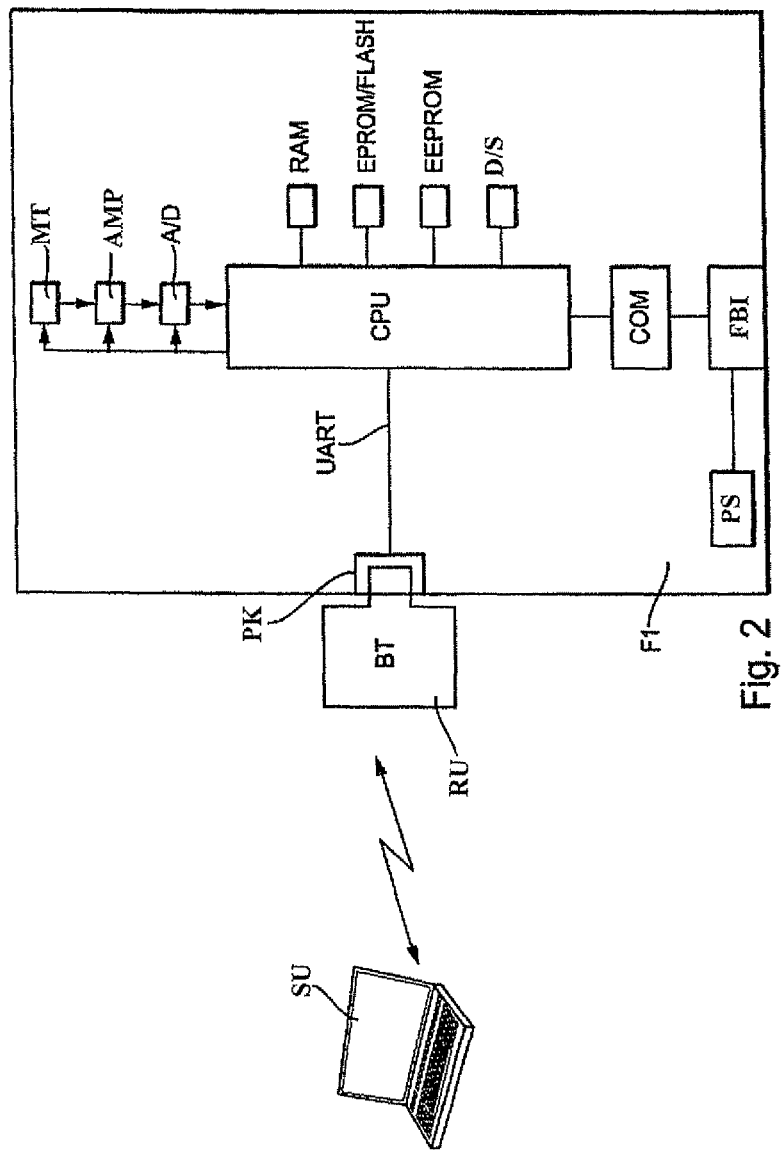
FIG. 2 a block diagram of a field device with radio unit.

FIG. 2 is a block diagram showing details of a field device of the invention e.g. field device F1. A computing unit CPU for processing measured values is connected, via an analog-digital converter A/D and an amplifier AMP, with a measurement transducer MT, that registers a process variable (e.g. pressure, flow rate, or fill level). The computing unit CPU is also connected with a plurality of memory units. Thus, a RAM memory serves as temporary working memory, a non-volatile EPROM memory EPROM or flash memory FLASH as memory for the control program to be run on the computing unit PU and an EEPROM memory as memory for calibration and starting parameter values, especially for the set-up program of the computing unit CPU.

A control program defines the application-oriented functionality of the field device (measured value computation, envelope curve evaluation, linearizing of measured values, diagnostic tasks).

Additionally, the computing unit CPU is connected with a display/service unit D/S (e.g. LCD display with 3-5 push buttons).

For communication with the fieldbus segment SM1, the computing unit CPU is connected via a communication controller COM with a fieldbus interface FBI. A power supply PS delivers the required energy for the individual electronic components of the field device F1. The supply lines to the individual components are not drawn for the sake of clarity.

In an alternative arrangement of the invention, the voltage supply of the field device F1 can be made, not via the interface FBI, but, instead, via a separate voltage supply unit.

A UART interface of the computing unit CPU is connected with a service plug connector PK, which serves in the case of conventional field devices as cable connection for a portable computer, e.g. laptop. A radio unit RU of the invention is detachably connected with the service plug connector PK.

Via a service unit SU, in this case a computer unit in the form of a laptop, the field device F1 can be serviced in simple manner wirelessly via radio.

Figure 3:
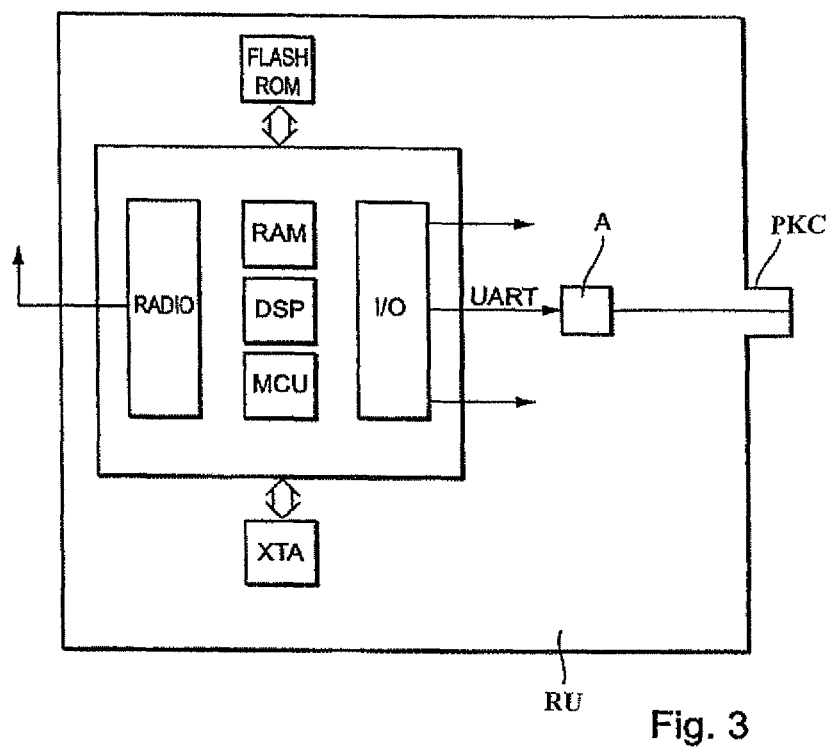
FIG. 3 a block diagram of a radio unit.

FIG. 3 shows a block diagram of a radio unit RU (e.g. Mitsumi WML-C19 or -C20), that conforms to the Bluetooth standard. The radio unit RU is composed essentially of a single-chip, Bluetooth module with corresponding, known components, such as a microcontroller MCU, digital signal processor DSP, volatile memory RAM and non-volatile memory Flash-ROM. The clock signal of a quartz oscillator XTA serves as time base. The radio connection is made by a radio unit RADIO working at 2.4 GHz.

Communication with the field device occurs via an I/O interface. The I/O interface includes, among various interfaces, a UART interface, which is connected with an adapter unit A.

From the adapter unit A, a connection leads to a plug connector counterpart PKC, which is designed to fit the service plug connector PK.

UART interfaces use TTL signals with levels of 5 or 3.3 volts. In certain cases, an adjustment to the signal levels of the UART interface in the field device F1 is needed. Adapter A serves for this.

Operation of the invention will now be described in greater detail.

If the radio unit RU is connected to the service plug connector PK of a field device, for example field device F1, then the radio unit RU asks the computing unit CPU for the identifier of the field device F1. The computing unit CPU reads the corresponding value from the EEPROM memory and transmits this value to the radio unit RU. In the same manner, the security code is read from the EEPROM memory and transferred to the radio unit RU.

If a Bluetooth-enabled service unit SU is in the vicinity of the radio unit RU and, thus, the field device F1, then the service unit and the radio-unit/field-device combination recognize each other and automatically establish a communication connection with one another.

The radio unit RU identifies itself to the service unit SU with the identifier read from the EEPROM memory of the field device F1. On the screen of the service unit, the entire Bluetooth environment including this identifier, is indicated. By clicking this identifier (e.g. Promass 83; SN: DEMO09910027) on the screen of the service unit SU, the user can open the field device F1 and service such with an appropriate operating program (e.g. the FieldTool application of the firm, Endress+Hauser). Also a plurality of field devices can be equipped each with a radio unit RU. All field devices located in range of the service unit SU are then recognized. In this case, a plurality of different identifiers is shown on the screen of the service. For the user, associating identifiers with corresponding field devices is very easy, since the identifiers are displayed on the screen in form understandable to the user.

The radio unit RU is advantageously connectable with any field devices equipped with a service plug connector. No matter to which field device it is connected, the individual identifier of the relevant field device is always used as identifier in the radio network and indicated, accordingly, at the service unit.

In order to avoid unauthorized servicing of a field device, input at the service unit SU of a security code matching the security code read from the field device F1 is necessary. Since checking of the security code is done by the radio unit RU, access of the field device F1 can already be prevented on this level. Thus, a communication connection to the field device is only established if a valid security code was entered. Without valid security code, no communication connection is established to the field device.

With the help of the apparatus of the invention, radio servicing of field devices is possible in simple manner. Since, during radio servicing, the identifier and security code of the equipment are used, in principle, for the user, there is no large difference, as compared with a direct servicing at the field devices. The association of the identifier indicated on the screen of the service unit and the corresponding field device is unequivocally given. A mistaken association and, thereby, a possibly incorrect servicing of the field device are thus excluded. The radio unit RU is very economical and can be connected simply and quickly with different field devices. In principle, one radio unit RU and one service unit SU are sufficient for wireless servicing of a whole group of field devices.

The invention claimed is:

1. A system comprising: a detachably connectable radio unit for a field device of automatic control technology wherein detachably connectable means being able to connect the radio unit to the field device and to disconnect the radio unit from the field device without performing any changes on the field device side save from installing and uninstalling physical contact between the radio unit and the field device by means of a connector, and a field device comprising a field bus interface and a service interface, wherein the field device is a sensor or an actuator, wherein the radio unit is equipped with an appropriate service plug connector for connecting the radio unit to the service interface in the field device, wherein the radio unit (RU) enables a radio connection via a radio network to a service unit (SU), and wherein the radio unit (RU) reads an identifier of the field device (F1) from a memory in the field device (F1) and uses the identifier of the field device for registration of the radio unit in the radio network.

2. The system as claimed in claim 1, wherein the radio network conforms to the Bluetooth standard.

3. The system as claimed in claim 1, wherein the radio unit (RU) reads from the memory a security code required for servicing the field device (F1), and permits access to the field device (F1) only if a correct security code is entered at the service unit.

4. The system as claimed in claim 1, wherein the radio unit (RU) is connectable with the service interface (PK) provided at the field device (F1).

5. The system as claimed in claim 1, wherein the radio unit has an interface and an adapter, the adapter serving to connect to a plug connector counterpart, which is designed to fit the appropriate service plug connector.

6. The system as claimed in claim 1, wherein a visual indicator is provided on the service unit indicating that it is possible to establish a radio connection with that field device.

7. The system as claimed in claim 1, wherein the identifier is a device name and a TAG-number or a serial number.

8. The system as claimed in claim 7, wherein via the device name, a user can identify the pertinent field device by associating the device name with a field device type.

9. The system as claimed in claim 1, wherein a serial number is also given to assist in the case where two field devices of one type are present.

10. The system as claimed in claim 1, wherein if the radio unit is connected to the service plug connector of a field device, then the radio unit asks the computing unit for the identifier of the field device, and the computing unit reads the corresponding value from its memory and transmits this value to the radio unit.

11. The system as claimed in claim 2, wherein if a Bluetooth-enabled service unit is in the vicinity of the radio unit and the field device, then the service unit and the radio-unit/field-device combination recognize each other and automatically establish a communication connection with one another.

12. The system as claimed in claim 1, wherein the radio unit identifies itself to the service unit with the identifier read from the memory of the field device.

13. The system as claimed in claim 1, wherein on a screen of the service unit, an entire Bluetooth environment consisting of Bluetooth modules available including the identifier, is indicated, and by selection from the screen of the service unit, a user can open the field device and service such with an appropriate operating program.

14. The system as claimed in claim 1, wherein a plurality of field devices can be equipped each with a radio unit, whereby all field devices located in range of the service unit (SU) are then recognized;
    wherein, a plurality of different identifiers are shown on a screen of the service unit, and
    wherein the identifiers are displayed on the screen of the service unit in form understandable to user for associating identifiers with corresponding field devices.

15. The system as claimed in claim 14, wherein an association of the identifier indicated on a screen of the service unit and the corresponding field device is unequivocally given, such that a mistaken association and, thereby, a possibly incorrect servicing of the field device, are excluded.

16. The system as claimed in claim 1, wherein the radio unit is advantageously connectable with any field devices equipped with a service plug connector, and wherein no matter to which field device it is connected, an individual identifier of a relevant field device is always used as identifier in the radio network and indicated, accordingly, at the service unit.

17. The system as claimed in claim 1, wherein:
    in order to avoid unauthorized servicing of a field device, input at the service unit (SU) of a security code matching a security code read from the field device (F1) is necessary; and
    wherein checking of the security code is done by the radio unit such that access of the field device can be prevented;
    whereby a communication connection to the field device is only established if a valid security code was entered, such that without valid security code, no communication connection is established to the field device.

* * * * *